United States Patent
Verma et al.

(10) Patent No.: US 11,294,654 B2
(45) Date of Patent: Apr. 5, 2022

(54) AUTOMATED RULES FOR CONTROLLED DISTRIBUTION OF PROGRAM INSTRUCTIONS

(71) Applicant: Microsoft Technology Licensing, LLC, Redmond, WA (US)

(72) Inventors: Nidhi Verma, Redmond, WA (US); Mangalam Rathinasabapathy, Bellevue, WA (US); Rahul Nigam, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 16/878,951

(22) Filed: May 20, 2020

(65) Prior Publication Data

US 2021/0365255 A1     Nov. 25, 2021

(51) Int. Cl.
| | |
|---|---|
| *G06F 8/60* | (2018.01) |
| *H04L 29/08* | (2006.01) |
| *H04L 67/10* | (2022.01) |
| *G06F 16/25* | (2019.01) |

(52) U.S. Cl.
CPC ............... *G06F 8/60* (2013.01); *H04L 67/10* (2013.01); *G06F 16/252* (2019.01)

(58) Field of Classification Search
None
See application file for complete search history.

(56) References Cited

U.S. PATENT DOCUMENTS

| | | | |
|---|---|---|---|
| 7,614,046 B2 | 11/2009 | Daniels et al. | |
| 8,806,574 B2 | 8/2014 | Manjunath | |
| 10,289,403 B1* | 5/2019 | Krishnaswamy | G06F 8/71 |
| 10,360,012 B2* | 7/2019 | De Capoa | G06F 8/64 |
| 10,725,763 B1* | 7/2020 | Chud | G06F 8/71 |

(Continued)

OTHER PUBLICATIONS

"Authorization for Google Services", Retrieved from: https://web.archive.org/web/20190410174230/https:/developers.google.com/apps-script/guides/services/authorization, Apr. 10, 2019, 6 Pages.

(Continued)

*Primary Examiner* — Philip Wang

(57) ABSTRACT

Traditionally, engineers (or developers) of a software provider may implement or maintain aspects of application services by executing jobs or joblets on computing resources of various scopes in a cloud computing environment. However, in some cases, executing certain types of engineer-initiated jobs may negatively impact customer experience and/or satisfaction with the application services. Automated policies for distributing engineer-initiated jobs increase validation testing, scope control, and deployment timing based on a dynamic risk analysis of each job. A multi-faceted approach to distributing engineer-initiated jobs ensures adequate regression testing (e.g., via ring validation and cool-down period) and facilitates controlled distribution (e.g., based on throttle, distribution timing, and deployment train position). An automatic override ensures critical customer outages can be resolved quickly and efficiently by bypassing at least some of the rules. Thereby, customer experience is improved and service interruptions and customer dissatisfaction are minimized when distributing engineer-initiated jobs for application services.

20 Claims, 9 Drawing Sheets

(56) References Cited

U.S. PATENT DOCUMENTS

| | | | |
|---|---|---|---|
| 2004/0060044 A1 | 3/2004 | Das et al. | |
| 2006/0048157 A1* | 3/2006 | Dawson | G06F 9/5072 |
| | | | 718/104 |
| 2010/0125827 A1* | 5/2010 | Francis | G06F 8/10 |
| | | | 717/109 |
| 2010/0162226 A1 | 6/2010 | Borissov et al. | |
| 2012/0042383 A1 | 2/2012 | Greene et al. | |
| 2012/0209947 A1* | 8/2012 | Glaser | G06F 9/5027 |
| | | | 709/217 |
| 2013/0042154 A1* | 2/2013 | Agarwal | G06F 11/079 |
| | | | 714/38.14 |
| 2014/0082623 A1* | 3/2014 | Aswath | G05B 15/02 |
| | | | 718/102 |
| 2014/0136901 A1 | 5/2014 | Butler et al. | |
| 2015/0363190 A1* | 12/2015 | Bhatia | H04L 67/10 |
| | | | 717/172 |
| 2017/0207970 A1* | 7/2017 | Macatangay | H04L 41/0866 |
| 2018/0041346 A1* | 2/2018 | Rathinasabapathy | |
| | | | H04L 9/3265 |
| 2018/0307522 A1* | 10/2018 | Wu | G06F 9/5083 |
| 2018/0373521 A1* | 12/2018 | Huang | G06F 8/65 |
| 2019/0303127 A1* | 10/2019 | Krishnaswamy | G06F 8/60 |
| 2020/0192651 A1* | 6/2020 | Mudumbai | H04L 41/14 |
| 2021/0064458 A1* | 3/2021 | Rathinasabapathy | |
| | | | G06F 11/0709 |
| 2021/0165669 A1* | 6/2021 | Nejad | G06F 8/60 |
| 2021/0200484 A1* | 7/2021 | Mohammad | G06F 3/1222 |

OTHER PUBLICATIONS

"Fusion Middleware Administering Zero Downtime Patching Workflows", Retrieved from: https://docs.oracle.com/middleware/12213/wls/WLZDT/preparing.htm#WLZDT114, Retrieved Date: Apr. 1, 2020, 16 pages.

"Patch Management", Retrieved from: https://web.archive.org/web/20191120180614/https:/www.qualys.com/apps/patch-management/, Nov. 20, 2019, 21 Pages.

Eby, et al., "Manage Windows as a service using Configuration Manager", Retrieved from: https://docs.microsoft.com/en-us/configmgr/osd/deploy-use/manage-windows-as-a-service, Mar. 3, 2020, 16 Pages.

Hendrickson, et al., "SharePoint Server zero downtime patching steps", Retrieved from: https://docs.microsoft.com/en-us/sharepoint/upgrade-and-update/sharepoint-server-2016-zero-downtime-patching-steps, Oct. 21, 2016, 15 Pages.

"International Search Report & Written Opinion issued in PCT Application No. PCT/US21/026740", dated Jul. 15, 2021, 13 Pages.

* cited by examiner

| Row# | Code ID 402 | Code Type 404 | Risk Level 406 | Scope 408 | Update Type 410 | Tenant 412 |
|---|---|---|---|---|---|---|
| 1 | S001 | Maintenance | High | Unknown | Read | Single |
| 2 | S002 | Update | High | Farm | Read/Write | Multiple |
| 3 | S003 | Update | Low | Network, Certificate | Read only | Multiple |
| 4 | S004 | Update | Medium | Farm, Database | Read/Write | Multiple |
| 5 | S005 | Maintenance | High | Database, Certificate | Read/Write | Multiple |

FIG. 4

| Rule ID 502 | Code ID 504 | Code Type 506 | Scope 508 | Update Type 510 | Throttle 512 | Cool-down 514 | Timing 516 |
|---|---|---|---|---|---|---|---|
| R001 | S001 | Issue-fix | farm | Read/Write | 10% farms/dist. | 24 hours | Off-Peak |
| R002 | S002 | Update | VM, farm | Read / Write | 10% VM/dist. | 24 hours | Off-Peak |
| R003 | S003 | Maintenance | database | Read | 20% DB/dist. | 6 hours | Any Time |

AUTOMATED RULES FOR CONTROLLED DISTRIBUTION OF PROGRAM INSTRUCTIONS

BACKGROUND

Use of a cloud computing environment for software products and services has become popular for both consumers and enterprises. Consumers and enterprises as customers of software providers may use computing resources of the cloud computing environment as tenants. End users of the customers may use productivity tools (e.g., features) of the application services to upload files, share files, and perform other operations, such as collaborate on tasks. In some aspects, customers may request customizations or updates to features of the application services. The cloud computing environment involves a distributed set of resources, including memory, processing units, and data storage communicatively interconnected via a secured network. The distributed computing resources may be integrated both physically and virtually. Virtual integration of servers enables dynamic allocation of resources for tenants of the cloud computing environment. This way, the service provider enables tenants to seamlessly and dynamically scale up or scale down usage by continually assessing and reallocating resources among servers hosting the tenants. However, in some cases, service provider may execute certain types of engineer-initiated jobs (e.g., engineering jobs) that negatively impact customer experience and/or satisfaction with the application services.

For example, engineers (or developers) of a software provider may implement or maintain aspects of the application services by executing jobs or joblets (hereinafter "engineering jobs") on computing resources of various scopes in the cloud. As used herein, a "scope" may refer to any logical division of computing resources within the cloud computing environment (e.g., farm, server, database, VLAN) or any object type associated with the application services (e.g., application endpoint). Scope policies may be used to define common scopes (e.g., virtual machine, farm, database, etc.) or scopes based on common policies shared between objects (e.g., application endpoint and device). Engineering jobs are executed based on program instructions (e.g., scripts) generated by engineers (e.g., an on-call engineer, OCE) and/or developers. The engineering jobs may be directed to maintenance (e.g., updating cloud infrastructure or application services), code fixes (e.g., correcting code), code updates (e.g., updating existing features), configurations (e.g., configuring settings or properties), customizations (e.g., enhancements requested by customers), and the like.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by distributing program instructions associated with engineering jobs based on automated policies that increase validation testing, scope control, and deployment timing based at least in part on a dynamic risk analysis of each engineering job. "Tenants," or customers, of application services may be hosted by a software provider on physical or virtual servers in a cloud computing environment. A "feature" may be associated with an operation performed by the application services, such as uploading a file, creating a list, sharing a file, authenticating a request, creating various parts of a portal page, etc. An "engineering job" is encoded by program instructions (or scripts) and is executed by the software provider to maintain, update, fix, configure, or customize the application services. As used herein, the term "distribute," "distribution," or "deployment" of program instructions (e.g., code and/or scripts) refers to execution of the program instructions against at least a portion of a scope.

As noted above, engineering jobs may be implemented based on program instructions (e.g., scripts) that are executed against a scope. However, issues may arise when the engineering jobs are deployed without sufficient testing, risk evaluation and/or scope control. For instance, without sufficient testing, errors (e.g., bugs) in the associated program instructions may negatively impact the customer experience for tenants within or outside of the scope. Depending on the type of engineering job, without risk evaluation and scope control, the deployment of the scripts may cause service interruptions for customers and/or outages for the software provider by overloading the computing resources within the cloud computing environment. Thus, insufficient internal controls for engineering jobs may result in distributing the program instructions too broadly, too quickly.

In particular, in order to address the issues identified above, the present systems and methods create and apply automated policies based on a dynamic analysis of the system and pending engineering jobs. For instance, scope attributes may be defined. Scope attributes may include a service scope level (e.g., farm level, database level, network level, tenant level, and the like) and an update property (e.g., read-write or read-only, such as Set/Get commands). Risk levels (e.g., low, medium, high) for different combinations of scope attributes may also be defined. For example, a read-only update property for a database level scope may be associated with low risk, a read-write update property on a tenant level scope may be associated with medium risk, and a read-write update property for a multiple-farm level scope may be associated with high risk. As a catchall, in cases where a "new" scope (e.g., a scope that was not previously defined) is selected by an engineer, the risk may default to "high." As should be appreciated, different combinations of scope attributes may be associated with different risk levels.

Based on the risk levels, rules (or policies) may be created to automate internal controls for engineering jobs. For instance, the rules may define one or more criteria for implementing engineering jobs associated with different risk levels. Criteria can include ring level validation, throttle, cool-down period, timing of distribution, and deployment train position. "Ring level validation" refers to a requirement that engineering jobs are distributed to an internal ring (or "Dogfood ring") before distributing the engineering jobs to an external ring (e.g., "Production ring"). For instance, an engineering job may be distributed to at least some internal users associated with the software provider (e.g., dogfood ring) before distributing the engineering job to external users associated with customers (e.g., production ring(s)). In aspects, there may be multiple production rings and the remaining criteria may be applied within each production ring. As used herein, a "throttle" refers to a subset (or portion) of the scope that program instructions can be executed against in each stage (or iteration) of distribution (e.g., a percentage of virtual machines (VMs) of a VM level scope, a percentage of farms across regions for a farm level scope, a percentage of databases of a database level scope, etc.). In aspects, a throttle for a high-risk job may be higher (e.g., slower distribution) than for a low-risk job. A "cool-down period" (or "bake time") refers to a period of time between stages (or iterations) of distributing an engineering job (e.g., a number of hours, a number of days, a number of weeks, etc.). In aspects, during the cool-down period, feedback (e.g., telemetry data) may be collected and evaluated to ensure that the engineering job is performing as intended before a next stage of distribution. In aspects, a cool-down period for a high-risk job may be longer than for a low-risk job.

Additionally, criteria for timing of distribution may be defined. "Peak" hours refer to a portion of a day (e.g., 6:00 am to 6:00 pm local time) during which customer demands on the cloud resources are prioritized, and "off-peak" hours refer to a portion of the day (e.g., 6:00 pm to 6:00 am local time) during which system maintenance, new or updated feature deployments, internal software provider activities, and the like, are conducted. A "deployment train" refers to a sequence of distributing engineering jobs (or batches of engineering jobs) and a "deployment train position" refers to a relative priority (or order) of one engineering job (or a batch of engineering jobs) versus another engineering job (or batch of engineering jobs) (e.g., higher priority engineering jobs are distributed before lower priority engineering jobs).

In some aspects, an automatic override workflow may be implemented. That is, to ensure that engineers have the ability to quickly address critical customer outages, certain engineering jobs (e.g., code fixes) may be exempt from application of the rules or may override the rules. For instance, the automatic override workflow may be associated with additional criteria, e.g., distribution by an engineer having a particular role (e.g., "OCE" or on-call engineer), a customer outage associated with a threshold level of severity (e.g., SEV 0), or an affected customer being associated with a special status (e.g., Watch List, Strategic Tenant). In this case, when the additional criteria are met, an automatic approval for overriding the rules may be issued. Alternatively, in special or extenuating circumstances, a manual approval for overriding the rules may be required.

As should be appreciated, the above multi-faceted approach to distributing engineering jobs ensures additional validation testing (e.g., via ring validation and cool-down period) and facilitates metered (or controlled) distribution (e.g., based on throttle, distribution timing, and deployment train position). In this way, additional validation testing improves customer experience and product satisfaction; while metered distribution prevents engineering jobs from being distributed too broadly too quickly, thereby preventing customer service disruptions and/or software provider outages by overloading system resources. An automatic override workflow ensures critical customer outages can be resolved quickly and efficiently by bypassing at least some of the rules. Thereby, the system and methods described herein address the issues of service interruptions and customer dissatisfaction associated with distribution of engineering jobs for application services provided via a cloud computing environment.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 4 illustrate an examples of a user script table in accordance with aspects of the present disclosure.

FIG. 5 illustrates an example of a rule table for distributing the user scripts in accordance with aspects of the present disclosure.

DETAILED DESCRIPTION

Figure 1:
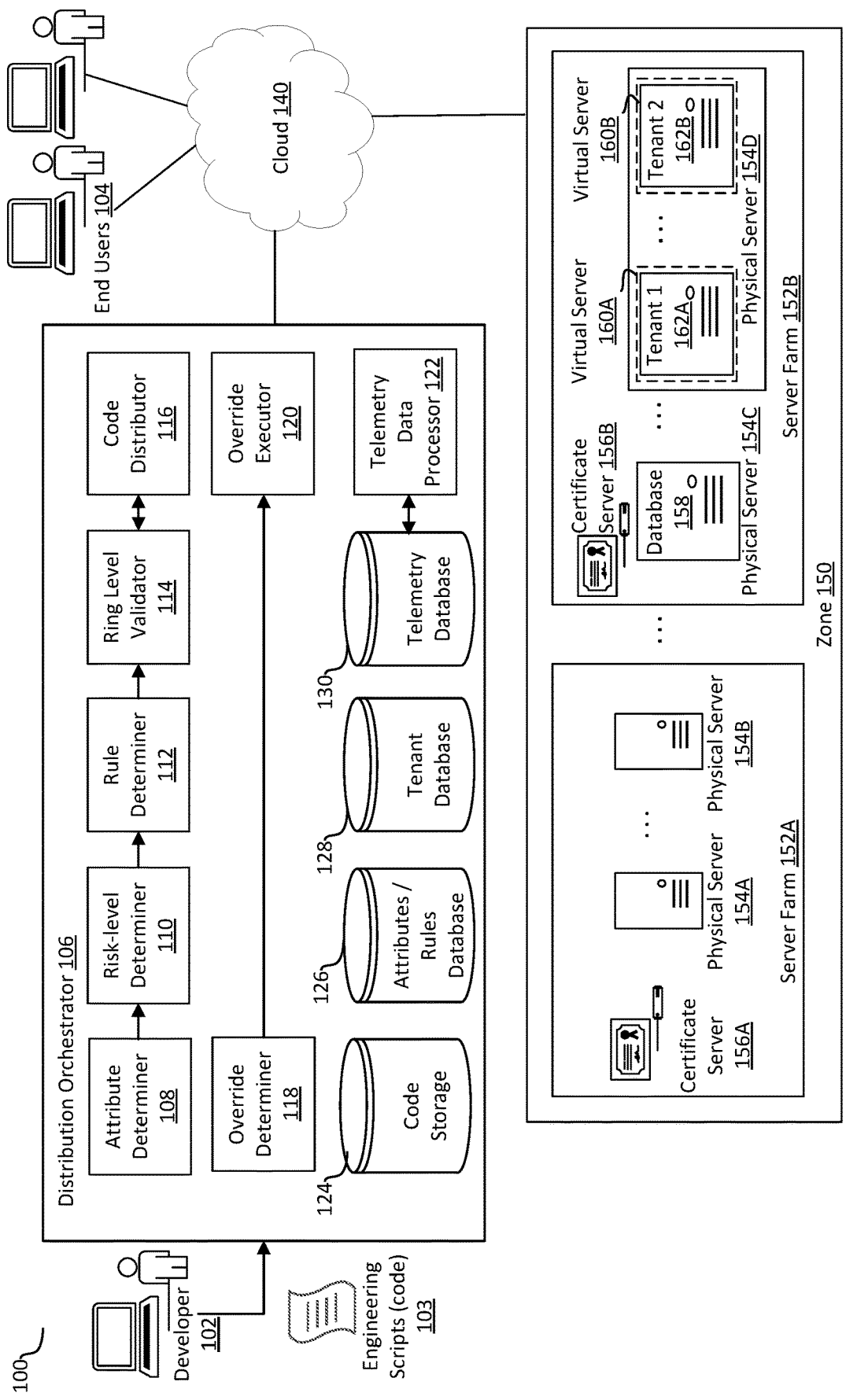
FIG. 1 illustrates an overview of an example system for distributing program instructions in accordance to aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to systems and methods for distributing program instructions to tenants of a cloud computing environment. Cloud computing environments are distributed systems, where application functionality, memory, data storage and retrieval, and various processing functions may be operated remotely from each other over a network, such as the Internet or a secure intranet. "Tenants," or customers, of application services may be hosted by a software provider on physical or virtual servers in the distributed system. Indeed, cloud-based application services have become widely used and relied on as business productivity tools. In this way, business end users associated with enterprise customers can collaborate online (store/share documents, access internal sites, lists/libraries, for example) from anywhere in the world. End users may access the services using a variety of devices, e.g., mobile phones, laptops and tablets. Application services are available for use 24 hours day, 365 days a year with minimal downtime for maintenance.

Generally, customers or tenants of application services have come to expect frequent updates that provide access to the latest new features and quickly distribute necessary fixes. Unlike standalone applications where program instructions reside on local computing devices of end users, the application service may be continually serviced by distributing program instructions (e.g., code or scripts) for engineering jobs to tenants hosted by servers in the cloud. These servers may collectively provide the application services to millions of users, for example. However, issues may arise when the distribution of the program instructions burdens cloud infrastructure and/or the distributed code contains errors. For example, an engineering job may affect resource functions within a scope of distribution, e.g., a virtual server or a physical server occupied by a tenant, a server farm, a zone, one or more network certificates in the cloud, and the like. In some cases, distribution of the engineering job occurs before completing an appropriate level of regression testing, for example. In some other aspects, execution of the engineering job against a scope may overload the system by excessive resource consumption, CPU usage rate and/or memory use, for example. Thus, increased testing, risk analysis, and scope control are desired for distribution of engineering jobs.

In aspects, engineering jobs include a set of scripts that are executed by engineers or developers of the software provider to maintain the application services, such as by updating properties of the computing resources, updating network address properties and certificates, addressing customer outages, upgrading system infrastructure, restoring deleted customer data, enabling new configurations to take effect, and the like. For instance, the engineering job may be directed to updating network address configurations (e.g., adding a IPv6 address schema), topological network data routing configurations, server access control configurations, and virtual machine configurations within physical servers, for example. Some configurations may be intended for one or more specific tenants, while others may be across multiple tenants within or across zones. However, in the past, engineering jobs have been deployed without sufficient testing, risk evaluation and/or scope control, potentially causing service disruptions and/or a subpar customer experience. To address these issues, the present application describes a multi-faceted approach to distributing engineering jobs. For instance, deployment of the engineering jobs is controlled by defining a scope of the computing resources being impacted by the deployment, assessing a risk associated with deploying the engineering job based on the defined scope and update properties (e.g., read-only or read-write), and generating a set of rules that control deployment of the engineering job.

For instance, the rules may involve defining criteria for deploying engineering jobs, such as ring level validation, throttle, cool-down period, timing of execution, and deployment train position. "Ring level validation" refers to a requirement that engineering jobs are distributed to an internal ring (or "Dogfood ring") before distributing the engineering jobs to an external ring (e.g., "Production ring"). For instance, an engineering job may be distributed to at least some internal users associated with the software provider (e.g., dogfood ring) before distributing the engineering job to external users associated with customers (e.g., production ring(s)). In aspects, there may be multiple production rings and the remaining criteria may be applied within each production ring. In this way, distribution of the program instructions may be implemented according to a hierarchy of regression testing. The hierarchy may be represented by multiple concentric "rings" of distribution: a "dogfood ring" for internal testing being the innermost ring and a "production ring" for external (e.g., customer) regression testing being the outermost ring, for example. Within each ring of distribution, there may be a set of users that receive assess to the application services after distribution of the engineering job and telemetry data may be collected and evaluated based on the user activity within the ring to determine if the engineering job executed properly.

As detailed above, the criteria may further involve a throttle that limits deployment of the engineering job to a portion of the defined scope in each iteration and a cool-down period that establishes a time period between iterations. Additionally, system resources may be evaluated to determine an order of distribution based on the throttle. For instance, if the throttle dictates that the engineering job should be executed against not more than 10% of farms of a farm level scope per iteration, the various farms of the farm level scope may be evaluated. Farms exhibiting high user activity may be deemed "hot," whereas farms having low user activity may be deemed "cold." To prevent potential service interruptions, the engineering job may be distributed to cold farms before warm or hot farms. That is, a first iteration may distribute the engineering job to 10% of farms deemed "cold," whereas a last iteration may distribute the engineering job to 10% of farms deemed "hot," with intermediate iterations each distributing to 10% of farms in the continuum from cold to warm to hot.

In aspects, after each iteration of deployment, telemetry data regarding execution of the engineering job and/or changes in consumption of computing resources, for example, may be evaluated during the cool-down period before proceeding to a next iteration. Thus, in combination with ring validation, an engineering job may be distributed in each ring based on a throttle with a cool down period between each distribution. For instance, an engineering job may be deployed in a series of distributions based on a throttle of 10 tenants per distribution or 5% of tenants per distribution, etc. After each distribution, execution of the engineering job may be evaluated to ensure code stability and user satisfaction during a cool down period. The cool down period may be 6 hours to 24 hours, for example. A distribution to a next ring may take place once the series of distributions in a prior ring are completed.

Criteria for distributing an engineering job may also involve defining timing of distribution. For instance, based on the job type (e.g., maintenance type versus code fix type), the engineering job may be distributed during a different period of the day (e.g., a maintenance job may be executed during off-peak hours whereas an urgent code fix job may be executed during peak hours to prevent further customer downtime). Peak and off-peak hours may be defined based on a local time of tenants associated with the defined scope for an engineering job. In some cases, the peak/off-peak hours may be predetermined (e.g., peak hours from 6:00 am to 6:00 pm and off-peak hours from 6:00 pm to 6:00 am). In other cases, peak/off-peak hours may be tenant-specific. For example, some tenants may have a peak time of using the application services during business hours between 9:00 am and 5:00 pm local time on weekdays; whereas other tenants may have peak hours from noon to midnight local time on weekends, for example.

Furthermore, engineering jobs (or batches of engineering jobs) may be ordered within a "deployment train" based on a relative priority of the engineering jobs (e.g., higher priority engineering jobs are distributed before lower priority engineering jobs). Traditionally, engineering jobs are executed in an order in which they are received (e.g., an order in which an engineer selected the engineering job for execution). As a result, merely based on timing of selection by engineers, higher-priority engineering jobs (e.g., a code fix to address a customer outage) were often executed after lower-priority engineering jobs (e.g., directed to general system maintenance). According to the present systems, priority levels for a plurality of engineering jobs selected for execution may be determined. Engineering jobs (or batches of engineering jobs) having a higher priority may then be distributed before engineering jobs (or batches of engineering jobs) having a lower priority. Upon ordering the engineering jobs within a distribution train, distribution of individual engineering jobs (or batches of engineering jobs of the same priority) may progress based on the ring validation, throttle, cool-down, and peak/non-peak criteria described above for the particular engineering job(s).

In some aspects, an automatic override workflow may be implemented. That is, to ensure that engineers have the ability to quickly address critical customer outages, certain engineering jobs (e.g., code fixes) may be exempt from application of the rules or may override the rules. For instance, the automatic override workflow may be associated with additional criteria, e.g., distribution by an engineer having a particular role (e.g., "OCE" or on-call engineer), a customer outage associated with a threshold level of severity (e.g., SEV 0), or an affected customer being associated with a special status (e.g., Watch List, Strategic Tenant). In this case, when one or more of the additional criteria are met, an automatic approval for overriding the rules may be issued. Alternatively, in some situations, a manual approval for overriding the rules may be obtain.

As should be appreciated, the above multi-faceted approach to distributing engineering jobs ensures additional validation testing (e.g., via ring validation and cool-down period) and facilitates metered or controlled distribution (e.g., based on throttle, distribution timing, and deployment train position). In this way, additional validation testing improves customer experience and product satisfaction; while metered distribution prevents engineering jobs from being distributed too broadly too quickly, thereby preventing customer service disruptions and/or software provider outages by overloading system resources. An automatic override ensures critical customer outages can be resolved quickly and efficiently by bypassing at least some of the rules described above. Thereby, the system and methods described herein address the issues of service interruptions and customer dissatisfaction associated with distribution of engineering jobs for application services provided via a cloud computing environment.

FIG. 1 illustrates an overview of an example system for distributing program instructions in accordance with aspects of the present disclosure. System 100 may represent a system for distributing program instructions to one or more tenants.

Developer 102 develops program instructions for engineering jobs executed against a scope to maintain, update, fix, configure or customize the application services hosted by a software provider in a cloud computing environment 140. In aspects, developer 102 provides the program instructions (e.g., engineering scripts 103) to the code storage 124 associated with distribution orchestrator 106. Developer 102 may select the program instructions for distribution (or execution) against a scope, for instance. In some cases, developer 102 may update the program instructions after distribution based on telemetry data from regression testing as received by telemetry data receiver 112. The telemetry data depicts how end users 104 interacted with the application services following distribution of the engineering job.

End users 104 of customers use computing devices to access the application services. For instance, the end users 104 may access the application services via cloud computing environment 140. The cloud computing environment 140 contains at least one zone (or region) 150. A zone 150 may contain one or more server farms 152A-152B. Server farms 152A-152B may contain virtual servers 160A-160B and physical servers 154A-154D. The server farms 152A-1502B may also include certificate servers 156A-156B. The certificate servers 156A-156B store and maintain certificates for authentications for access to networks and computing resources, such as databases and servers, for example. The server farms 152A-152B in the zone 150 provide application services, such as file sharing, workflow services, collaboration tools, for example, to the end users 104. In aspects, there may be millions of end users 104 using various application services made available through the cloud computing environment 140.

Cloud computing environment 140 may comprise one or more resources, including one or more servers (e.g., comprising processing units and memory) and one or more databases communicatively coupled over a network. The cloud computing environment may be organized into one or more server farms 152A-152B containing one or more virtual servers 160A-160B and/or one or more physical servers 154A-154C. In aspects, the server farms 152A-152B may form zone 150. The one or more virtual servers 160A-160B and one or more physical servers 154A-154C organized into server farms 152A-152B in zone 150 collectively provide application services to end users 104. In aspects, the virtual servers 160A-160B partitioned on one or more physical servers 154A-154C provide the functionalities of a dedicated server to one or more customers (e.g., tenants). For instance, tenant 1 162A may occupy one virtual server 160A and tenant 2 162B may occupy another virtual server 160B on a physical server 154D, for example.

In aspects, memories in the respective virtual servers 160A-160B and physical servers 154C-154D may store program instructions for execution by Central Processing Unit (CPU), not shown in the figure. The servers implement the application services by executing the program instructions. In some aspects, engineering jobs encoded by engineering scripts 103 may be executed against a scope to maintain, update, fix, configure or customize the application services. As used herein, a "scope" may refer to a tenant, a group of tenants, a server farm, a group of server farms, a group of users, or any other logical division of the cloud computing environment 140.

Distribution Orchestrator 106 receives a set of program instructions for distribution, and then schedules and implements the distribution. In aspects, the developer 102 registers code associated with engineering jobs for storing in the code storage 124. In some other aspects, the developer 102 requests a code distribution (e.g., deployment) of the program instructions against a scope. The distribution orchestrator 106 may assign a code ID to the set of program instructions. The engineering job may be directed to maintaining, updating, enhancing or rectifying (fixing) an issue of the application services.

Attribute determiner 108 may determine attributes (or parameters) of a set of program instructions selected for execution against a scope. As described above, the scope may include any logical division of the cloud computing environment 140, including virtual servers, physical servers, server farms, zones (or regions), certificate servers, networks, databases, and the like. In aspects, the scope may be selected by developer 102 and indicates the division of the cloud computing environment 140 against which the set of program instructions is to be executed. For instance, for an engineering job directed to updating properties of virtual servers, the corresponding scope may be virtual servers. In contrast, an engineering job directed to a code fix or enhancement requested by a tenant may have a corresponding scope of the physical server hosting the tenant. Accordingly, an attribute associated with the scope may be a scope level (e.g., farm level, database level, network level, tenant level, and the like). The set of program instructions may also be evaluated by attribute determiner 108. For instance, an attribute associated with the program instructions may be an update property (e.g., read-write or read-only, such as Set/Get commands) regarding how the program instructions are to be executed on the scope. Additionally, attribute determiner 108 may determine a job type of the engineering job associated with the set of program instructions. For example, engineering jobs may be of a maintenance type, an update type, a configuration type, a customization type, a code fix type, and the like. The job type associated with the set of programing instructions may be received from the developer 102, for example.

Risk-level determiner 110 may determine a risk level associated with executing the set of program instructions against the scope based on the attributes determined by attribute determiner 108. The risk level may have values of High, Medium, and Low, for example. As described above, a scope may include any logical division of the cloud computing environment 140 and a scope level attribute may include a virtual server level, a physical server level, a server farm level, a zone level, a certificate server level, a network level, a database level, and the like. Additionally, an update property attribute associated with the set of program instructions may include read-only or read-write, for example. The risk levels (e.g., low, medium, high) for different combinations of attributes may also be defined. For example, a read-only update property for a database level scope may be associated with low risk, a read-write update property on a tenant level scope may be associated with medium risk, and a read-write update property for a multiple-farm level scope may be associated with high risk. As a catchall, in cases where a "new" scope (e.g., a scope that was not previously defined) is selected by an engineer, the risk may default to "high." As should be appreciated, different combinations of attributes may be associated with different risk levels.

Rule determiner 112 may determine one or more rules to control distribution of a set of program instructions based on a risk level. In aspects, a rule may be determined from a list of predefined rules in a rule table. Rules may comprise a throttle of distribution, a cool-down period, and timing of executing the set of program instructions, for example. A "throttle" refers to a subset (or portion) of the scope that program instructions can be executed against in each stage (or iteration) of distribution (e.g., a percentage of virtual machines (VMs) of a VM level scope, a percentage of farms across regions for a farm level scope, a percentage of databases of a database level scope, etc.). In aspects, a throttle rule for a high-risk job may be higher (e.g., slower distribution) than a throttle rule for a low-risk job. A "cool-down period" refers to a period of time between stages (or iterations) of distributing the set of program instructions (e.g., a number of hours, a number of days, a number of weeks, etc.). In aspects, during the cool-down period, feedback (e.g., telemetry data) may be collected and evaluated to ensure that the set of program instructions executed properly before a next stage of distribution. In aspects, a cool-down rule for a high-risk job may be longer than a cool-down rule for a low-risk job. Thus, the cool-down rule may be 6 hours for a low-risk job and the cool-down rule may be 24 hours for a high-risk job, for example. In this way, based on the throttle and cool-down rules, distribution of the set of program instructions may controlled and verified to prevent a subpar customer experience. Additionally, insider activity and/or developer error may be prevented.

Additionally or alternatively, rule determiner 112 may determine one or more rules associated with timing of executing the set of program instructions. For instance, based on the risk level (e.g., low, medium, high) and/or job type (e.g., maintenance type versus code fix type), the program instructions may be distributed during a different period of the day. "Peak" hours refer to a portion of a day (e.g., 6:00 am to 6:00 pm local time) during which customer demands on the cloud resources are prioritized, and "off-peak" hours refer to a portion of the day (e.g., 6:00 pm to 6:00 am local time) during which system maintenance or internal software provider activities are conducted. Thus, a timing rule may dictate whether the set of program instructions should be executed during a peak period or an off-peak period. For instance, a timing rule for a maintenance job may be executed during off-peak hours whereas a timing rule for a code fix job may be executed during peak hours to prevent further customer downtime. In either case, service disruptions and/or customer dissatisfaction may be minimized. Additionally or alternatively, system resources may be evaluated to determine an order (or timing) of distribution of the set of program instructions based on the throttle. For instance, if the throttle dictates that the program instructions should be executed against not more than 10% of farms of a farm level scope per iteration, the various farms of the farm level scope may be evaluated. Farms exhibiting high user activity may be deemed "hot," whereas farms having low user activity may be deemed "cold." To prevent potential service interruptions, a cold/hot rule may dictate that the set of program instructions are distributed to cold farms before warm or hot farms. That is, based on the cold/hot rule, a first iteration may distribute the set of program instructions to 10% of farms deemed "cold," whereas a last iteration may distribute the set of program instructions to 10% of farms deemed "hot," with intermediate iterations each distributing to 10% of farms in the continuum from cold to warm to hot. In this way, the rules may be dynamically applied based on the status of system resources at the time of distribution, thereby avoiding customer service disruptions or outages.

Ring level validator 114 may receive an indication to start distribution of the program instructions associated with an engineering job at a specific ring level. In contrast to traditional systems, deployment of a set of program instructions associated with engineering jobs may undergo multiple ring levels of validation and testing. "Ring level validation" refers to a requirement that engineering jobs are distributed to an internal ring (or "dogfood ring") before distributing the engineering jobs to an external ring (e.g., "production ring"). For instance, an engineering job may be distributed to at least some internal users associated with the software provider (e.g., dogfood ring) before distributing the engineering job to external users associated with customers (e.g., production ring(s)). In aspects, there may be multiple production rings and the other rules may be applied within each production ring. In this way, distribution of the program instructions may be implemented according to a hierarchy of regression testing. This hierarchy may be represented by multiple concentric "rings" of distribution: a "dogfood ring" for internal testing being the innermost ring and a "production ring" for external (e.g., customer) regression testing being the outermost ring, for example. Within each ring of distribution, there may be a set of users that receive assess to the application services after distribution of the engineering job and telemetry data may be collected and evaluated based on the user activity within the ring to determine if the engineering job executed properly. In aspects, the validation may be received from a manager who manages quality control for the application services. Validation of a ring level may be distinct among different ring levels. For instance, validation of the "dogfood" level may involve developer 102 and the manager; whereas validation of the production level distribution may involve the quality control manager as well as a customer relationship manager who maintains communications with affected tenants, for example. In this way, additional verification of the set of program instructions may prevent a subpar customer experience as well as potential service disruptions. Additionally, the additional layers of validation prevent insider activity and/or developer error.

Code distributor 116 may deploy the program instructions based on ring level validation and application of the one or more rules. For instance, at a first ring level, the program instructions may be distributed to internal users associated with the software provider. Upon validation of the first ring level, the program instructions may be distributed to external users associated with customers in a second ring level. In some aspects, the external users within the second ring level may be specially selected by the software provider to provide feedback regarding execution of the program instructions and/or performance of the engineering job. In other aspects, the program instructions are distributed in the second ring level (and any subsequent ring levels) based on a throttle rule, a cool-down rule, and timing rule(s). That is, code distributor 116 enforces the rules as determined by the rule determiner 112. In some aspects, such controlled distribution may be based on a deployment train model. The deployment train model may controls a sequence of distributing different sets of program instructions based on a relative priority of the associated engineering jobs (e.g., higher priority engineering jobs are distributed before lower priority engineering jobs). Traditionally, engineering jobs are executed in an order in which they are received (e.g., an order in which an engineer selected the engineering job for execution). As a result, higher-priority engineering jobs (e.g., a code fix to address a customer outage) were often executed after lower-priority engineering jobs (e.g., directed to general system maintenance). According to the present systems, code distributor 116 may determine priority levels for a plurality of engineering jobs associated with program instructions selected for execution. Engineering jobs (or batches of engineering jobs) having a higher priority may then be distributed before engineering jobs (or batches of engineering jobs) having a lower priority. Upon ordering the engineering jobs within the distribution train, code distributor 116 may then distribute an individual set of program instructions (or batches of program instructions of the same priority) based on the ring level validation, throttle, cool-down, and timing rules described above for a particular set of program instructions. In some aspects, ring level validator 114 validates each ring level after completing code distributions at that ring level before distributing to a next ring level.

Override executor 120 may determine and execute an override workflow under certain circumstances. That is, to ensure that engineers have the ability to quickly address critical customer outages, certain engineering jobs (e.g., code fixes) may be exempt from the rules or may "override" the rules described above. For instance, the override workflow may be associated with override criteria, e.g., distribution by an engineer having a particular role (e.g., "OCE" or on-call engineer), a customer outage associated with a threshold level of severity (e.g., SEV 0), or an affected customer being associated with a special status (e.g., Watch List, Strategic Tenant). In this case, when one or more of the override criteria are met, override determiner 118 may issue an automatic approval for overriding the rules. Alternatively, in some cases, a manual approval for overriding the rules may be issued by a manager-on-duty or other authorized individual. Upon approval, override-workflow executor 120 may execute the override workflow such that the set of program instructions may be executed against the defined scope selected by a developer (e.g., developer 102). The override workflow is provided as safety valve to bypass the rules when the engineering job (e.g., code fix) addresses an urgent customer issue. In some cases, the override workflow may bypass ring level validation as well as application of the rules. In other cases, the override workflow may bypass application of the rules within a current ring of the ring level validation. In some aspects, e.g., to prevent insider activity, the overflow workflow may require an additional approval (e.g., automated or manual, as described above). As should be appreciated, the override workflow allows on-call engineers to quickly address urgent customer issues by bypassing the rules, thereby minimizing time to resolve (TTR) customer issues and improving customer satisfaction. At the same time, satisfying the override criteria prevents potential insider activity.

Telemetry data processor 122 may receive and process status information from servers within the scope of distribution (or the portion of the scope). The status information describes how end users 104 of customers interact with the application services following distribution of the set of program instructions. Additionally or alternatively, the telemetry data may provide information regarding resource usage within the scope of distribution, e.g., CPU usage rate, network speed or bandwidth, and the like. For instance, the telemetry data may include logs of end users accessing the application services (e.g., click data, number of requests issued, response times, etc.) and/or error reports identifying errors or exceptions that occurred while executing the program instructions. In aspects, the developers 102 may receive the telemetry data for analyzing execution or performance of the program instructions. In some cases, the developers 102 may update the set of program instructions for correcting any identified issues before further distribution.

When code distributor 116 completes distribution of the program instructions to the first validation ring level, ring level validator 114 validates a next validation ring level for distribution of the set of program instructions by code distributor 116. In some cases, if a developer updates the set of program instructions based on the telemetry data, code distributor 116 may distribute the updated set of program instructions to the next validation ring level. Alternatively, code distributor 116 may distribute the updated set of program instructions to the first validation ring level.

Code storage 124 stores sets of program instructions. The code storage 124 may store the sets of program instructions by assigning identifiers to respective sets. In some aspects, the code storage 124 comprises a queue of program instructions for distribution. The developer 102 may add the program instructions to the queue when the set of program instructions is selected for distribution or after revising the set of program instructions (e.g., based on an analysis of the telemetry data).

Attributes/rules database 126 stores information about various attributes of scopes that determine risks of distributing program instructions and a list of rules for controlling distribution of the program instructions based on the determined risks. The various attributes may include but are not limited to a scope level (e.g., farm level, database level, network level, tenant level, and the like), an update property (e.g., read-write or read-only, such as Set/Get commands) regarding how the program instructions are to be executed on the scope, and a job type of the engineering job associated with the set of program instructions. For example, engineering jobs may be of a maintenance type, an update type, a configuration type, a customization type, a code fix type, and the like. The job type associated with the set of programing instructions may be received from the developer 102, for example. The list of rules may include a set of rules indexed by rule identifiers. The list of rules may include but is not limited to a throttle rule, a cool-down rule, and/or a timing rule (or rules). The attributes/rules database 126 may also include a list of override criteria for executing the override workflow, including a particular role for a qualifying engineer (e.g., "OCE" or on-call engineer), a threshold level of severity (e.g., SEV 0) for a customer outage, special statuses (e.g., Watch List, Strategic Tenant) for an affected customer, and the like.

Tenant database 128 stores information about tenants (or customers). The information about tenants may include but is not limited to a tenant identifier, a tenant name, identifiers of computing resources hosting the tenant (e.g., a virtual server, a physical server, a server farm, and zone, for example). The tenant database 128 may also include statistical data regarding tenant usage levels of the application services by end users of the tenant.

As should be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
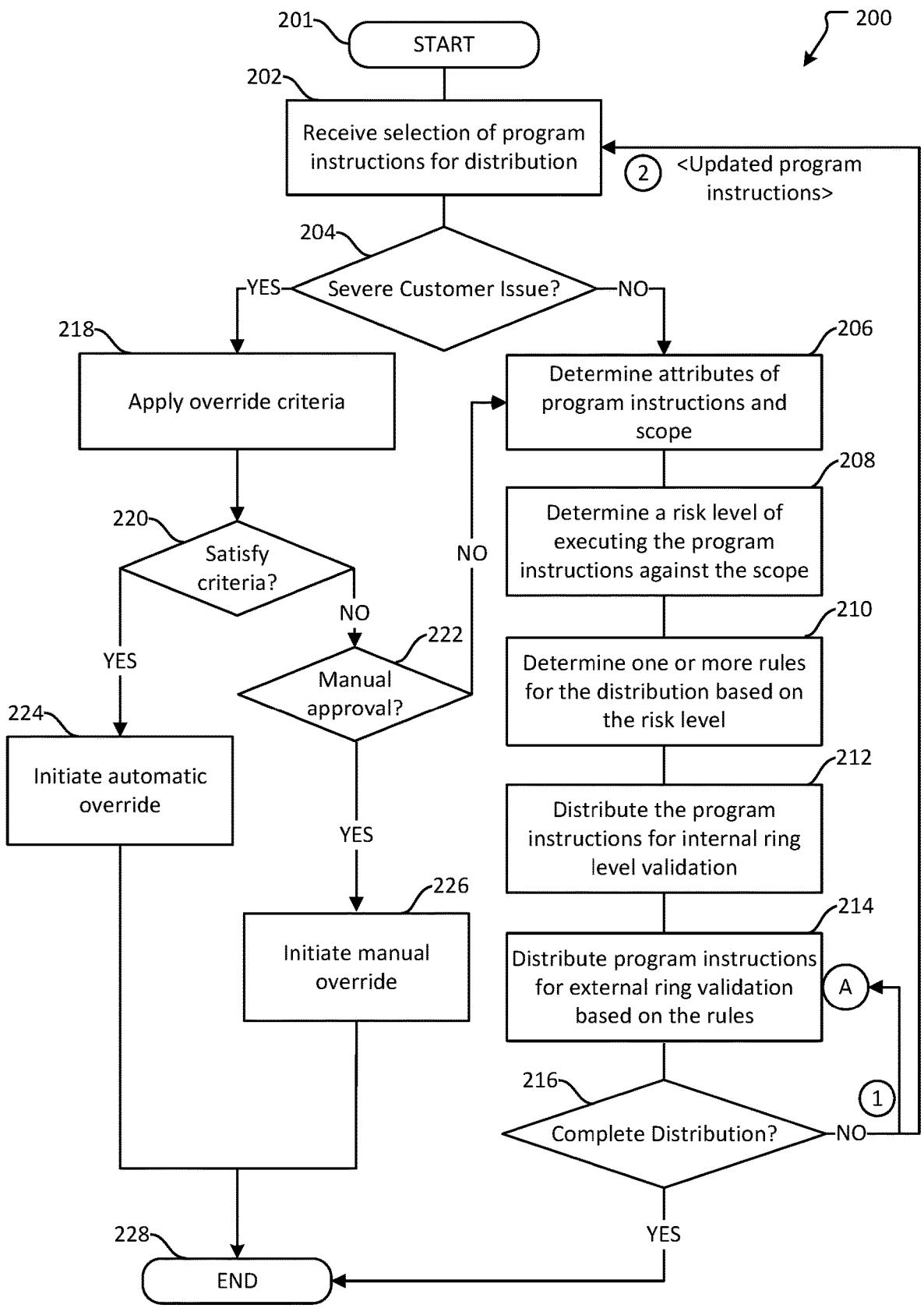
FIG. 2 illustrates an example method of distributing program instructions in accordance with aspects of the present disclosure.

FIG. 2 illustrates an example method of distributing program instructions in accordance with aspects of the present disclosure.

A general order of the operations for the method 200 is shown in FIG. 2. Generally, the method 200 begins with a start operation 201 and ends with an end operation 228. The method 200 may include more or fewer steps or may arrange the order of the steps differently than those shown in FIG. 2. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3, 4, 5, 6, 7, 8A-B.

At select operation 202, program instructions (e.g., code or script) may be selected for distribution against a scope. For instance, a developer may select the program instructions for distribution. The program instructions may implement an engineering job to maintain the application services, such as by updating properties of the computing resources, updating network address properties and certificates, addressing customer outages, upgrading system infrastructure, and the like. The scope may include any logical division of a cloud computing environment, including virtual servers, physical servers, server farms, zones (or regions), certificate servers, networks, databases, and the like.

At determination operation 204, it may be determined whether the program instructions encode an engineering job directed to addressing a customer outage associated with a threshold level of severity (e.g., SEV 0). For instance, SEV 0 outages may refer to critical customer outages. If the engineering job addresses a critical customer outage, the operation proceeds to determine attribute operation 206. If the engineering job does not address a critical customer outage, the operation proceeds to apply operation 218.

At attribute determination operation 206, attributes of the program instructions and scope may be determined. For instance, an attribute associated with the scope may be a scope level (e.g., farm level, database level, network level, tenant level, and the like). An attribute associated with the program instructions may be an update property (e.g., read-write or read-only, such as Set/Get commands) regarding how the program instructions are to be executed on the scope. Additionally, a job type of an engineering job associated with the program instructions may be determined. For example, engineering jobs may be of a maintenance type, an update type, a configuration type, a customization type, a code fix type, and the like.

At risk determination operation 208, a risk level associated with executing the program instructions against the scope may be determined based on the attributes. The risk level may correspond to a potential for adversely affecting customers by distributing the program instructions. For example, a read-only update property for a database level scope may be associated with low risk, a read-write update property on a tenant level scope may be associated with medium risk, and a read-write update property for a multiple-farm level scope may be associated with high risk. As a catchall, in cases where a "new" scope (e.g., a scope that was not previously defined) is selected by an engineer, the risk may default to "high." As should be appreciated, different combinations of attributes may be associated with different risk levels.

At rule determination operation 210, one or more rules for distributing the program instructions may be determined based on the risk level. In some aspects, the rules may be identified from a predetermined list of rules (e.g., stored in attributes/rules database 126). In other aspects, the one or more rules may be dynamically generated based on the risk levels. Rules may include ring validation, a throttle, a cool-down period, and/or a timing of distribution. For instance, a rule may be generated requiring ring level validation of the program instructions. "Ring level validation" refers to distributing the program instructions to an internal ring (or "dogfood ring") before distributing the program instructions to an external ring (e.g., "production ring"). In aspects, there may be multiple production rings and the other rules may be applied within each production ring. A throttle refers to a subset (or portion) of the scope that the program instructions can be executed against in each stage (or iteration) of distribution (e.g., a percentage of virtual machines (VMs) of a VM level scope, a percentage of farms across regions for a farm level scope, a percentage of databases of a database level scope, etc.). In aspects, a throttle for a high-risk job may be higher (e.g., slower distribution) than for a low-risk job. A "cool-down period" refers to a period of time between stages (or iterations) of distributing an engineering job (e.g., a number of hours, a number of days, a number of weeks, etc.). In aspects, during the cool-down period, feedback (e.g., telemetry data) may be collected and evaluated to ensure that the engineering job is performing as intended before a next stage of distribution. In aspects, a cool-down period for a high-risk job may be longer than for a low-risk job.

Additionally, rules for timing (or ordering) distribution of the program instructions may be determined. For instance, based on the risk level (e.g., low, medium, high) and/or job type (e.g., maintenance type versus code fix type), the program instructions may be distributed during a different period of the day. For instance, a timing rule may dictate whether the program instructions should be executed during a peak period or an off-peak period (e.g., a maintenance job may be executed during off-peak hours whereas an urgent code fix job may be executed during peak hours to prevent further customer downtime). Additionally or alternatively, system resources may be evaluated to determine an order (or timing) of distribution of the set of program instructions based on the throttle. For instance, if the throttle dictates that the program instructions should be executed against not more than 10% of farms of a farm level scope per iteration, the various farms of the farm level scope may be evaluated. Farms exhibiting high user activity may be deemed "hot," whereas farms having low user activity may be deemed "cold." To prevent potential service interruptions, a cold/hot rule may dictate that the program instructions should be distributed to cold farms before warm or hot farms. In this way, the rules may be dynamically applied based on the status of system resources at the time of distribution, thereby avoiding customer service disruptions or outages.

At internal distribution operation 212, the program instructions may enter an internal ring of ring level validation. In aspects, ring level validation refers to a requirement that engineering jobs are distributed to an internal ring (or "Dogfood ring") before distributing the engineering jobs to an external ring (e.g., "Production ring"). For instance, the program instructions may be distributed to at least some internal users associated with the software provider in a first level ring before distributing the program instructions to external users associated with customers (e.g., in a second level ring and subsequent level ring(s)).

At external distribution operation 214, the program instructions may enter external ring validation and be distributed according to the determined rules. In some aspects, the external users within the second ring level may be specially selected by the software provider to provide feedback regarding execution of the program instructions and/or performance of the engineering job. In other aspects, the program instructions are distributed in the second ring level (and subsequent ring levels) based on the rules generated at rule determination operation 210, including a throttle rule, a cool-down rule, and timing rule(s). For instance, a throttle rule defines a subset (or portion) of the scope that the program instructions can be executed against in each stage (or iteration) of distribution (e.g., a percentage of virtual machines (VMs) of a VM level scope, a percentage of farms across regions for a farm level scope, a percentage of databases of a database level scope, etc.). A cool-down rule defines a period of time between stages (or iterations) of distributing the set of program instructions (e.g., a number of hours, a number of days, a number of weeks, etc.). Thus, within the second ring level, the program instructions may be distributed to a first subset of the scope, and then to a second subset of the scope following the cool-down period. Additionally, the program instructions may be distributed based on timing rules (e.g., during peak or off-peak hours) and ordering rules (e.g., to cold portions of the scope prior to warm or hot portions, and in a distribution train position based on a priority of the associated engineering job). In aspects, telemetry data may be received and processed (e.g., by telemetry data processor 122) during cool-down periods between iterations to ensure that the program instructions are executing properly and/or the engineering job is performing as intended before distributing the program instructions in a next iteration. In some cases, if anomalies are identified during a cool-down period, distribution of the program instructions may be discontinued and the program instructions may be updated accordingly (e.g., by an engineer or developer). In other cases, external distribution operation 214 may include recurring distributions of the program instructions to portions of the scope based on the throttle rule. The rate of recurrence may be determined based on the cool-down rule.

At determination operation 216, it may be determined whether distribution of the program instructions has been completed. For instance, it may be determined if the program instructions were executed against the scope selected by the engineer. That is, whether the program instructions distributed to each of a plurality of portions of the scope over multiple iterations has completed distribution of the program instructions to the full scope. If distribution is complete, the method may progress to end operation 228. If distribution is not complete, the method may progress to either external distribution operation 214 or select operation 203. For instance, if distribution is not complete and the program instructions were updated (e.g., due to an anomaly identified during the cool-down period following an iteration), the method may progress to select operation 203 (reference "2"). Thereafter, at select operation 203, the updated program instructions may be selected for distribution. Alternatively, if distribution is not complete and the program instructions were not updated, the method may progress to external distribution operation 214 (reference "1"). In this case, a next iteration of distribution based on the throttle, cool-down, and timing rules may be initiated.

At apply operation 218, override criteria may be applied to determine whether the engineering job should be automatically approved for immediate distribution. For instance, if it was determined at determination operation 204 that the program instructions encode an engineering job directed to addressing a critical customer outage (e.g., SEV 0), criteria for overriding (or bypassing) the rules may be evaluated at apply operation 218. For instance, at apply operation 218, a role of the engineer who selected the program instructions for distribution and/or a status of the customer associated with the critical customer outage may be evaluated. As should be appreciated, additional or alternative override criteria may be evaluated at apply operation 218.

At determination operation 220, it may be determined whether at least one (or a threshold number) of the override criteria have been satisfied. For instance, if the engineer is an on-call engineer ("OCE"), at least one of the override criteria may be satisfied. If the customer associated with the critical customer outage is associated with a special status (e.g., Watch List, Strategic Tenant) and/or the customer has a threshold number of active external users (e.g., 1000), at least one of the override criteria may be satisfied. In some cases, upon satisfaction of at least one of the override criteria, the method may progress to automatic override operation 224. In other cases, satisfaction of a threshold number (or all) of the override criteria must be satisfied to advance to automatic override operation 224. If at least one (or a threshold number) of the override criteria are not satisfied, the method may progress to manual determination operation 222.

At manual determination operation 222, when at least one (or a threshold number) of the override criteria are not satisfied, manual approval for bypassing the rules may be obtained. For instance, manual approval may be obtained from a manager-on-duty or some other authorized individual. If manual approval is obtained, the method may progress to manual override operation 226. If manual approval is not obtained, the method may progress to attribute determination operation 206, where distribution of the program instructions will proceed based on application of the rules.

At automatic override operation 224, upon automatic approval, the program instructions may be distributed substantially immediately against the scope to address the critical customer outage. That is, the program instructions may bypass application of the rules during distribution (e.g., ring level validation, throttle, cool-down, and timing) to enable an engineer (e.g., the OCE) to quickly address the critical customer outage. In this way, time to resolve (TTR) the customer issue is minimized, thereby improving customer satisfaction. At the same time, based on satisfaction of the override criteria, insider activity may be prevented for code distributions that bypass the rules. Upon substantially immediately distributing the program instructions against the scope to address the critical customer outage, the method may progress to end operation 228.

At manual override operation 224, upon manual approval, the program instructions may be distributed substantially immediately against the scope to address the critical customer outage. That is, the program instructions may bypass application of the rules during distribution (e.g., ring level validation, throttle, cool-down, and timing) to enable an engineer (e.g., the OCE) to quickly address the critical customer outage. In this way, time to resolve (TTR) the customer issue is minimized, thereby improving customer satisfaction. At the same time, based on receipt of the manual approval, insider activity may be prevented for code distributions that bypass the rules. Upon substantially immediately distributing the program instructions against the scope to address the critical customer outage, the method may progress to end operation 228.

Figure 3:
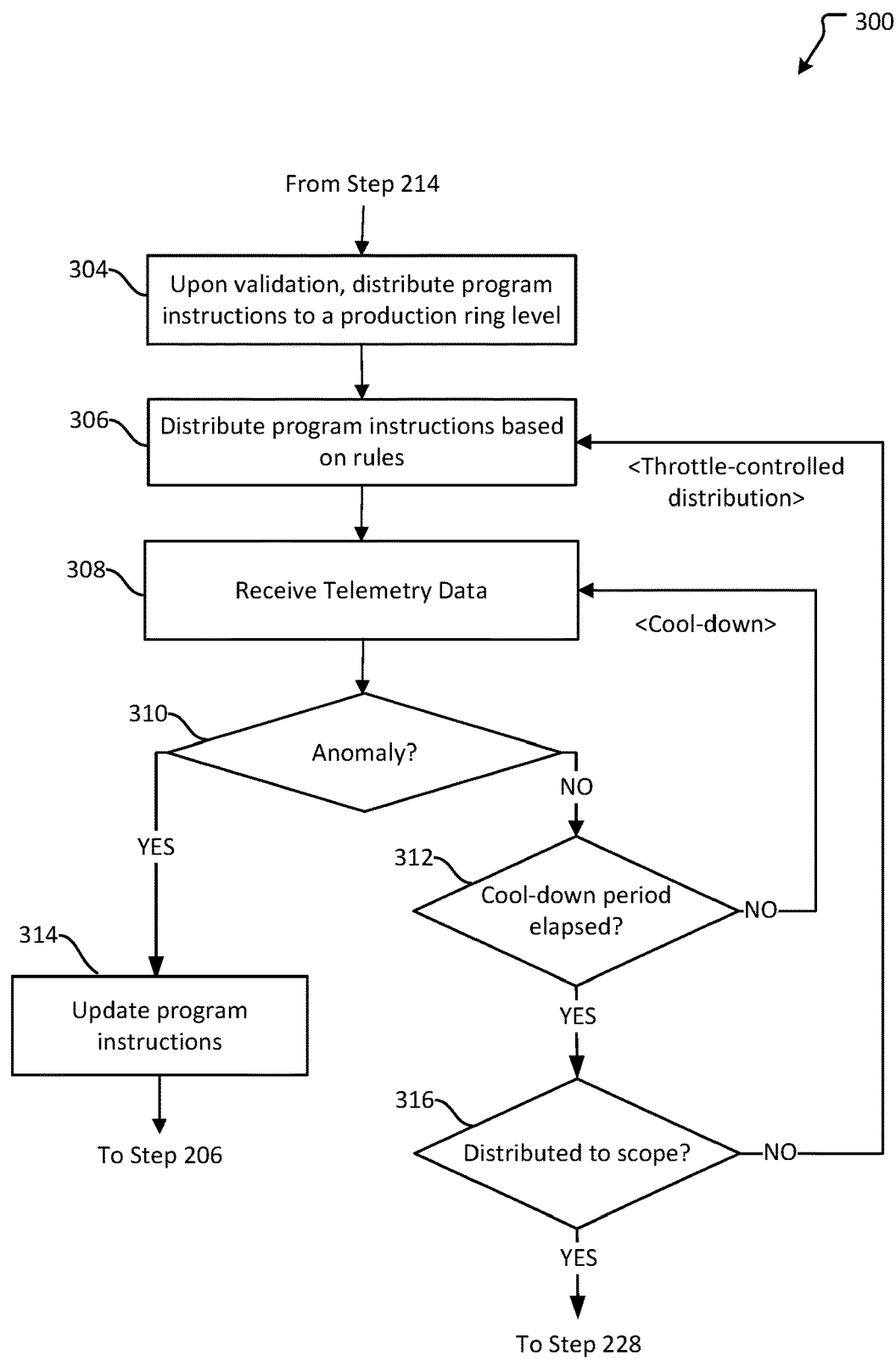
FIG. 3 illustrates an example method of distributing the program instructions in an external ring level based on application of rules according to aspects of the present disclosure.

In aspects, external distribution operation 214 constitutes external deployment of the program instructions to one iteration within at least one external ring of validation (as indicated "A"). An iteration of the deployment within a ring comprises one or more distributions of the program instructions based on the throttle, cool-down, and timing rules described above. FIG. 3 describes a more detailed sequence of operations for external distribution operation 214.

As should be appreciated, operations 202-228 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 3 illustrates an example method of distributing the program instructions in an external ring level based on application of rules according to aspects of the present disclosure. A general order of the operations for the method 300 is shown in FIG. 3. Generally, the method 300 illustrates a sequence of operations for external distribution operation 214 of FIG. 2. The method 300 may include more or fewer steps or may arrange the order of the steps differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2, 4, 5, 6, 7, 8A-B.

At external distribution operation 304, upon validation of an internal ring of distribution (e.g., dogfood ring), the program instructions may be distributed to an external ring. For instance, the program instructions may be distributed to resources hosting external users associated with customers in the external ring (e.g., production ring).

At rule distribution operation 306, the program instructions may be distributed in the external ring based on rules (e.g., rules generated at rule determination operation 210), including a throttle rule, a cool-down rule, and timing rule(s). For instance, a throttle rule defines a subset (or portion) of the scope that the program instructions can be executed against in each stage (or iteration) of distribution (e.g., a percentage of virtual machines (VMs) of a VM level scope, a percentage of farms across regions for a farm level scope, a percentage of databases of a database level scope, etc.). A cool-down rule defines a period of time between stages (or iterations) of distributing the set of program instructions (e.g., a number of hours, a number of days, a number of weeks, etc.). For instance, at rule distribution operation 306, the program instructions may be distributed to a first subset of the scope (and then to a second subset and subsequent subsets of the scope following cool-down period (s)). Additionally, the program instructions may be distributed based on timing rules (e.g., during peak or off-peak hours) and ordering rules (e.g., to cold subsets of the scope prior to warm or hot subsets, and in a distribution train position based on a priority of the associated engineering job).

At receive telemetry data operation 308, telemetry data may be received and processed (e.g., by telemetry data processor 122) during cool-down periods between iterations of distribution to ensure that the program instructions are executing properly and/or the engineering job is performing as intended before distributing the program instructions in a next iteration. For instance, the telemetry data may include logs related to how end users accessing the application services (e.g., click data, input queries and output results, success reports or error reports, etc.). In aspects, the telemetry data may be stored in a telemetry database (e.g., telemetry database 130) and may update or be used in conjunction with the dynamic attributes stored in the server usage database 126.

At anomaly determination operation 310, it may be determined whether one or more anomalies occurred when executing the program instructions during an iteration of distribution. An anomaly may refer to any error or exception that occurred during execution of the program instructions, or any error or exception associated with performance of the associated engineering job. For instance, the telemetry data may log an error or exception based on end user interactions (e.g., click data, user requests, response times, etc.) with the application services following execution of the program instructions. If one or more anomalies are detected, distribution of the program instructions may be discontinued and the method may progress to update operation 314. When one or more anomalies are detected, a notification may be sent to the OCE and/or a developer of the program instructions. If one or more anomalies are not detected, the method may progress to cool-down determination operation 312.

At cool-down determination operation 312, it may be determined whether a cool-down period has elapsed. The cool-down period is a period of time required between stages (or iterations) of distributing the set of program instructions (e.g., a number of hours, a number of days, a number of weeks, etc.). For example, the cool-down period may be 6 hours for a low-risk engineering job or 24 hours for a higher-risk engineering job. If a time since the distribution of the program instructions at rule distribution operation 306 is greater than or equal to the cool-down period, the method may progress to scope determination operation 316. If a time since the distribution of the program instructions at rule distribution operation 306 is less than the cool-down period, the method may return to receive telemetry data operation 308.

At update operation 314, the program instructions may be updated (e.g., by an engineer or developer) to address the anomaly. For instance, when one or more anomalies are detected during execution of the program instructions, a notification may be sent to the OCE and/or a developer of the program instructions. Updating the program instructions may involve evaluating the script for errors (e.g., debugging), revising the script to improve performance of the engineering job, and the like. Upon updating the program instructions, the method may progress to determine attribute operation 206 of FIG. 2.

At scope determination operation 316, it may be determined whether the program instructions have been executed against the scope selected by the engineer. That is, whether the program instructions distributed to each of a plurality of subsets of the scope over multiple iterations has resulted in executing the program instructions against the full scope. If distribution is complete for the full scope, the method may progress to end operation 228 of FIG. 2. If distribution is not complete for the full scope, the method may return to rule distribution operation 306, where the program instructions will be distributed in next iteration based on the rules. In some cases, returning to rule distribution operation 306 may further involve entering a next external ring of validation.

As should be appreciated, operations 302-316 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 4 illustrate an examples of a user script table in accordance with aspects of the present disclosure.

For instance, FIG. 4 illustrates an example data structure of various parameters (or attributes) related to program instructions (i.e. code or script) associated with an engineering job. The attributes may be stored in an attributes/rules database (e.g., attributes/rules database 126). Each row (e.g., rows 1-5) of code list 400 corresponds to a set of program instructions. The table entries are sorted based on a code identifier of the set of program instructions. Code ID 402 indicates a code ID for each set of program instructions (e.g., Code IDs S001-S005). Code type 404 a type of code, e.g., maintenance, configuration, customization, code fix, or code update, for example. Risk level 406 specifies a risk level of deploying each set of program instructions. Risk levels may include Low, Medium, and High based on a potential for adversely affecting one or more customers during execution of the program instructions. Scope 408 specifies a logical division of computing resources within a cloud computing environment that the program instructions are to be executed against. The scope 408 may include but is not limited to "virtual server (VM)," "physical server," "farm," "zone," "network," "certificate server," "database," and "unknown," for example. As shown in Risk level column 406, a risk associated with an unknown scope is High.

Update type 410 indicates update functionality (or update properties) of the program instructions. In some cases, the program instructions may include read instructions only. In other cases, the program instructions may include read-write instructions. In aspects, the update property of the set of program instructions affects the risk level. For program instructions that contain read instructions but not write instructions, the overall risk level of adversely affecting customers when executing the program instructions is lower because the program instructions do not modify data or code on the cloud computing resources. Alternatively, program instructions that contain write instructions may modify at least some data or code on the cloud computing resources, which may adversely affect customers using the same resources (e.g., within the scope of deployment).

Tenant 412 indicates whether deployment of the program instructions targets at a single tenant or multiple tenants in the cloud. In aspects, the program instructions may relate to a tenant-specific customization of the application services. In this case, execution of the program instructions may adversely impact the single tenant (e.g., in the case of an anomaly). Alternatively, program instructions directed to maintenance of a server farm may affect multiple tenants hosted on that server farm. In this case, any anomalies associated with executing the program instructions may adversely impact the multiple tenants. Distribution of program instructions that may affect a single tenant may be associated with a lower risk level than distribution of program instructions that may affect multiple tenants.

As an example of the program instructions, a program instruction with Code ID 402 of "S005" represents a script for an engineering job to change (read and write) various properties in databases and certificates for multiple tenants. Code Type 404 has a value "Maintenance," with a Risk Level 406 of "High," a Scope 408 of "Database, Certificate," and Update type 410 of "Read/Write," and a Tenant 412 of "Multiple."

As should be appreciated, the various methods, components, attributes, etc., described with respect to FIG. 4 are not intended to limit the systems and methods to the particular attributes described. Accordingly, additional topology configurations may be used to practice the methods and systems herein and/or some attributes described may be excluded without departing from the methods and systems disclosed herein.

FIG. 5 illustrates examples of data structures used for a rule table according to an example system in accordance with aspects of the present disclosure.

Each row (e.g., rows 1-3) of the table 500 corresponds to a rule. The rule table 500 includes Rule ID 502, Code ID 504, Code Type 506, Scope 508, Update Type 510, Throttle 512, Cool-down 514, and Timing 516. Rule ID 502 indicates an identifier (e.g., R001) of a rule selected for application when distributing a set of programing instructions (e.g., S001). Code ID 504 indicates a code ID for each set of program instructions (e.g., S001-S003). Code Type 506 indicates a type of job implemented by each set of programing instructions, e.g., maintenance, issue fix, configuration, or update, for example. Scope 508 specifies a logical division of computing resources within a cloud computing environment against which a set of program instructions is to be executed, e.g., "virtual server (VM)," "physical server," "farm," "zone," "network," "certificate server," "database," and "unknown." Update Type 510 indicates update functionality (or update properties) of the program instructions (e.g., "read-only" or "read-write"). In aspects, Code Type 506, Scope 508, and Update Type 510 identify attributes of the program instructions. That is, rule R001 is applicable under a condition where the program instructions are of code type "issue-fix" against a scope of "server farm" and have an update property of "read/write."

Throttle 512 indicates a subset (or portion) of the scope that program instructions can be executed against in each stage (or iteration) of distribution (e.g., 10% of farms per distribution, 10% of virtual servers per distribution, 10% of databases per distribution). Cool-down 514 indicates a time period (e.g., 6 hours or 24 hours) to wait before starting a next round of distributions. Timing 516 indicates a local time during the day (e.g., "Any Time" and "Off-Peak") for executing the program instructions. In aspects, "Any Time" allows the program instructions to be executed during either peak or off-peak hours.

For example, a rule with Rule ID 502 "R003" represents an exemplary rule to apply for distributing a set of program instructions directed to a maintenance job for getting (e.g., reading) properties in databases and certificate servers. In this case, Code ID 504 is "S003," Code Type 506 is "Maintenance," Scope 508 is "database," Update Type 510 is "Read," Throttle 512 is "20% of databases," Cool-down 514 is "6 hours," and Timing 516 is "Any Time." Among the rules as shown in examples in FIG. 5, the rule R001 imposes looser control in deploying the program instructions. The rule has a relatively low throttle (e.g., higher distribution) and a shorter cool-down period (e.g., 6 hours), for example.

As should be appreciated, the various methods, components, attributes, etc., described with respect to FIG. 5 are not intended to limit the systems and methods to the particular attributes described. Accordingly, additional topology configurations may be used to practice the methods and systems herein and/or some attributes described may be excluded without departing from the methods and systems disclosed herein.

Figure 6:
FIG. 6 illustrates an example of a distribution sequence table in accordance with aspects of the present disclosure.

FIG. 6 illustrates an example of a distribution sequence table in accordance with aspects of the present disclosure.

The example scheduling table 600 includes Distribution ID 602, Code ID 604, Rule ID 606, Ring Level 608, Distribution Train Position 610, and Current Status 612. Each row of the table may correspond to an iteration of distribution of a set of program instructions.

Distribution ID 602 indicates an identifier (e.g., "D001") of an iteration of the distribution. Code ID 604 indicates an identifier (e.g., "S003") of a set of program instructions being distributed. The set of program instructions may be stored in the code storage 124, for example. Rule ID 606 indicates an identifier of at least one rule to be applied during the distribution (e.g., throttle, cool-down, timing, etc.). Ring level 608 indicates a ring level of testing (e.g., "Dogfood" indicating an internal ring of testing, "Production 1" indicating a first production-level of distribution to tenants. Distribution Train Position 610 indicates a position (e.g., "Second" or "First") within a distribution train for distributing program instructions S003 and S001, respectively. Current Status 612 indicates a current status of the respective distributions. Current status 612 of the distribution D001 is at "Bake 60% complete," whereas Current Status 612 of the distribution D002 is "Live 75% complete." The Current State 612 indicates that the distribution process is in a "bake state" (e.g., distribution is paused during a cool-down time period) or a "live state" (e.g., distribution is active) and indicates a percentage completion of the distribution (e.g., a percentage complete against the scope).

As should be appreciated, the various methods, components, attributes, etc., described with respect to FIG. 6 are not intended to limit the systems and methods to the particular attributes described. Accordingly, additional topology configurations may be used to practice the methods and systems herein and/or some attributes described may be excluded without departing from the methods and systems disclosed herein.

Figure 7:
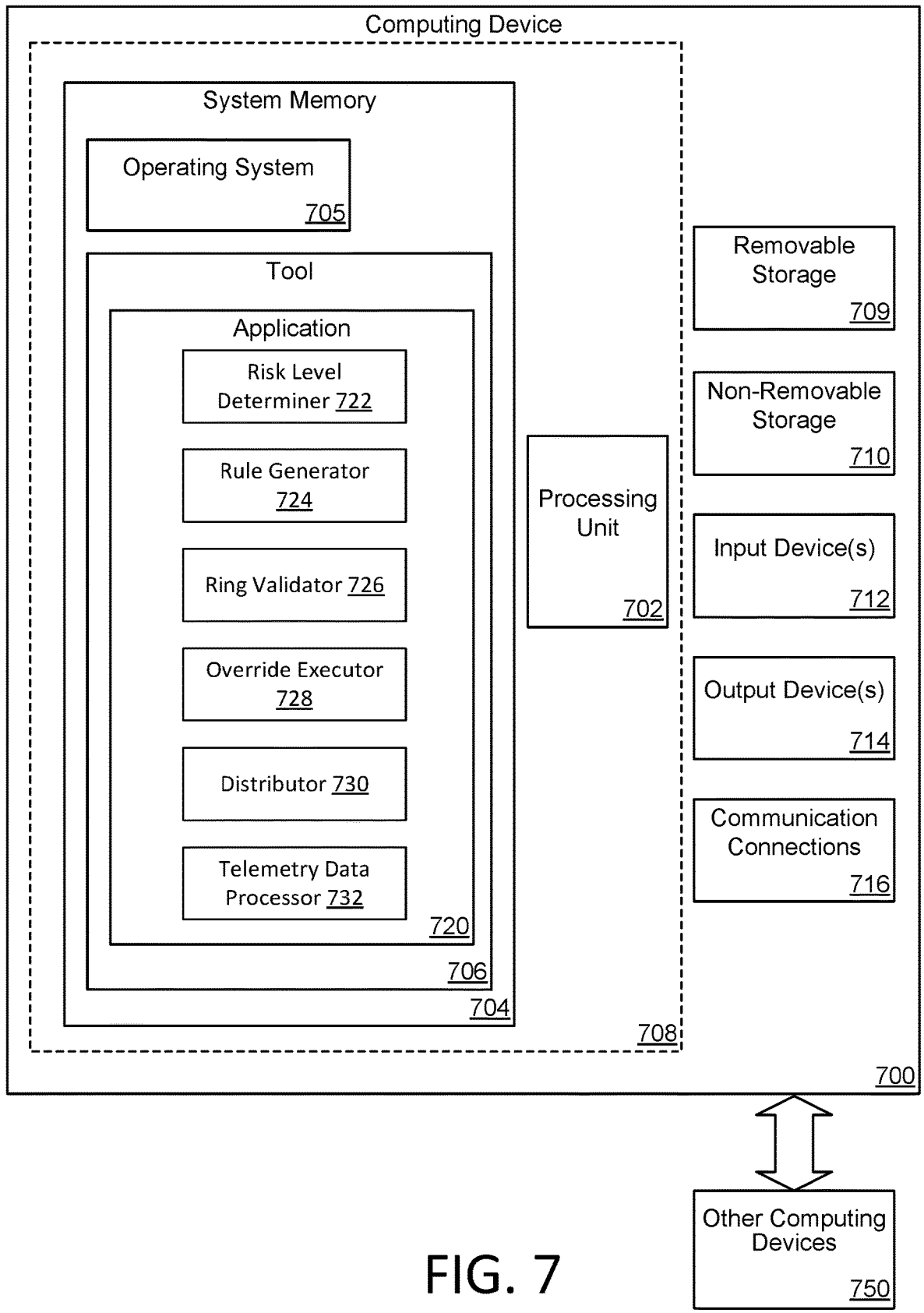
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the processing unit 702, the program tools 706 (e.g., code distribution application 720) may perform processes including, but not limited to, the aspects, as described herein. The code distribution application 720 includes a risk level determiner 722, a rule generator 724, a ring validator 726, an override executor 728, a distributor 730, and a telemetry data processor 732, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
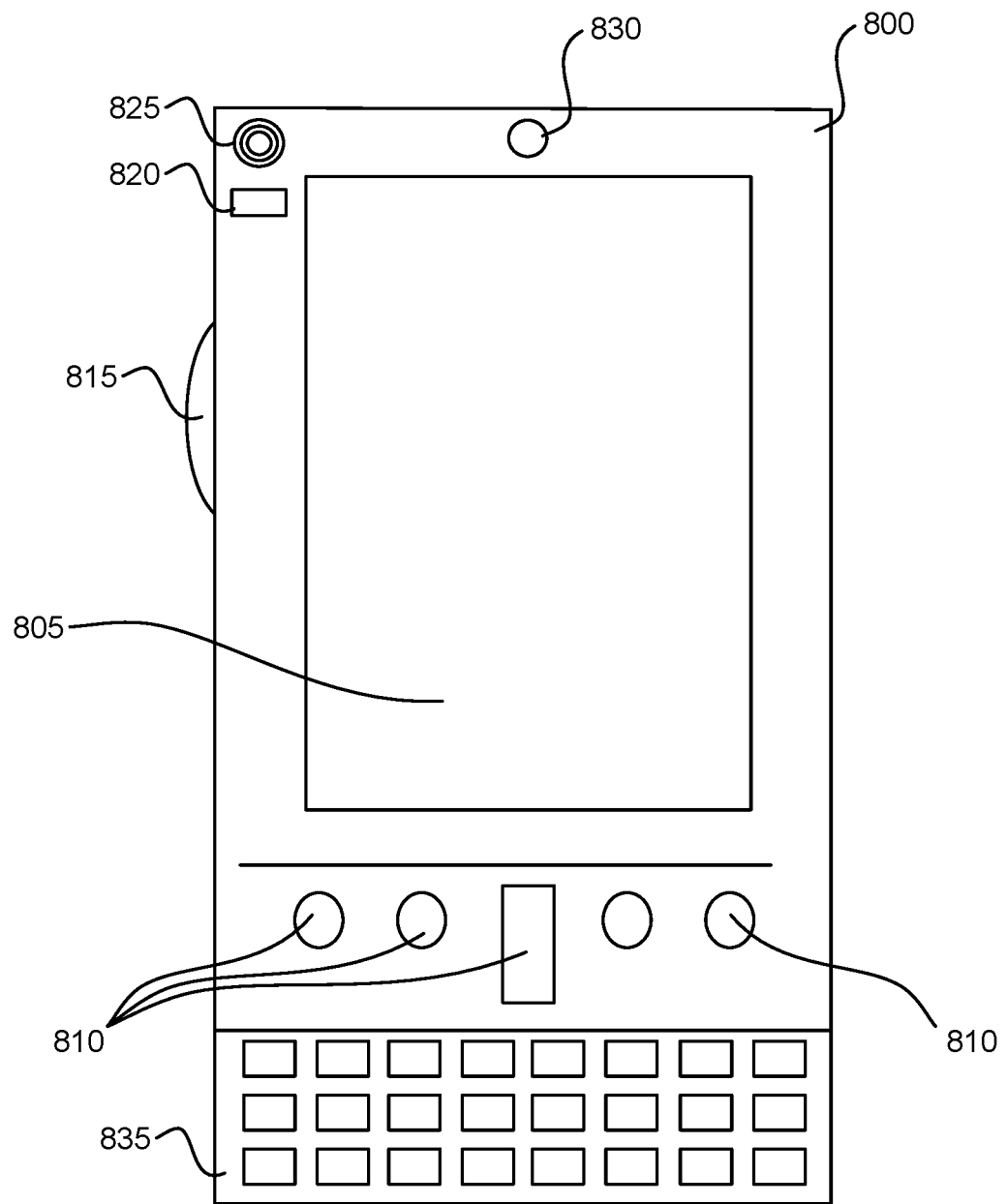
FIG. 8A is a simplified diagram of a mobile computing device with which aspects of the present disclosure may be practiced.
Figure 8B:
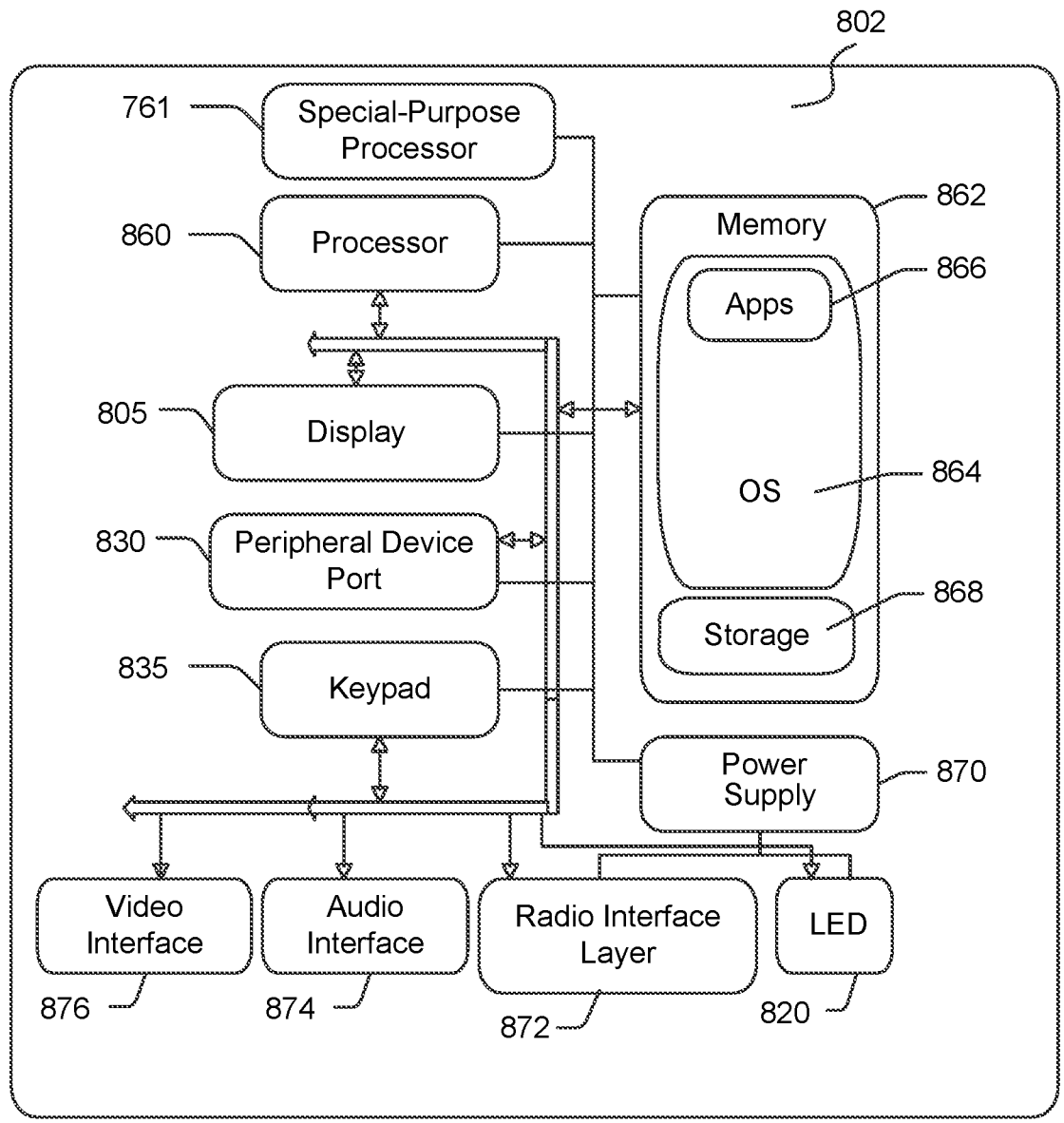
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., end users 104 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., physical servers 154A-154D or virtual servers 160A-160B in FIG. 1), a mobile computing device, etc. That is, the computing device 800 can incorporate a system (e.g., an architecture) 802 to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In aspects, a computer-implemented method of distributing program instructions is provided. The method includes receiving a selection of program instructions for distribution, where the program instructions when executed implement an engineering job against a scope of a cloud computing environment. Additionally, the method includes determining whether the engineering job addresses a critical customer outage and, in response to determining that the engineering job does not address a critical customer outage, determining one or more attributes associated with at least one of the program instructions or the scope. Based on the determined attributes, the method includes determining a risk level of executing the program instructions against the scope and, based on the risk level, the method includes determining one or more rules for governing distribution of the program instructions. Additionally, based on the one or more rules, the method includes distributing the program instructions to a subset of the scope.

In further aspects, a system is provided. The system including a processor and a memory storing computer-executable instructions that when executed by the processor cause the system to perform operations. The operations include receiving a selection of program instructions for distribution, where the program instructions when executed implement an engineering job against a scope of a cloud computing environment. Additionally, the operations include determining one or more attributes associated with at least one of the program instructions or the scope and, based on the determined attributes, determining a risk level of executing the program instructions against the scope. Based on the risk level, the operations include determining one or more rules for governing distribution of the program instructions, where the one or more rules comprise at least a throttle rule and a cool-down rule. Based on the throttle rule, the operations further include distributing the program instructions to a first subset of the scope and, based on the cool-down rule, waiting for a period of time. Based on the throttle rule, the operations include distributing the program instructions to a second subset of the scope.

In still further aspects, a computer storage medium is provided. The computer storage medium stores computer-executable instructions that when executed by a processor cause a computer system to perform operations. The operations include receiving a selection of program instructions for distribution, where the program instructions when executed implement an engineering job against a scope of a cloud computing environment. The operations further include determining one or more attributes associated with at least one of the program instructions or the scope and, based on the determined attributes, determining a risk level of executing the program instructions against the scope. Based on the risk level, the operations include determining one or more rules for governing distribution of the program instructions and, based on the one or more rules, distributing the program instructions to a subset of the scope. During a period of time specified by the one or more rules, the operations include receiving telemetry data regarding distribution of the program instructions to the subset of the scope and, based on the telemetry data, updating the program instructions.

Any of the one or more above aspects in combination with any other of the one or more aspect. Any of the one or more aspects as described herein.

What is claimed is:

1. A computer-implemented method of distributing program instructions, the method comprising:
   receiving a selection of program instructions for distribution, wherein the program instructions when executed implement an engineering job against a scope of a cloud computing environment;
   determining whether the engineering job addresses a critical customer outage;
   in response to determining that the engineering job does not address a critical customer outage, determining one or more attributes associated with at least one of the program instructions or the scope;
   based on the determined attributes, determining a risk level of executing the program instructions against the scope;
   based on the risk level, determining one or more rules for governing distribution of the program instructions; and
   based on the one or more rules, distributing the program instructions to a subset of the scope.

2. The computer-implemented method of claim 1, wherein the scope comprises a logical division of resources within the cloud computing environment.

3. The computer-implemented method of claim 2, wherein the subset of the scope comprises a percentage of the scope.

4. The computer-implemented method of claim 1, further comprising:
   in response to determining that the engineering job addresses a critical customer outage, evaluating one or more override criteria;
   in response to determining that at least one override criteria is satisfied, automatically overriding the one or more rules; and
   distributing the program instructions against the scope without applying the one or more rules.

5. The computer-implemented method of claim 1, further comprising:
   in response to determining that the engineering job addresses a critical customer outage, evaluating one or more override criteria;
   in response to determining that the override criteria are not satisfied, requesting manual approval for overriding the one or more rules; and
   in response to receiving the manual approval, distributing the program instructions against the scope without applying the one or more rules.

6. The computer-implemented method of claim 5, further comprising:
   in response to receiving a denial of the manual approval, distributing the program instructions to the subset of the scope based on the one or more rules.

7. The computer-implemented method of claim 1, wherein the one or more rules comprise one or more of a ring level validation rule, a throttle rule, a cool-down rule, or a timing rule.

8. The computer-implemented method of claim 7, wherein the ring level validation rule provides that the program instructions are distributed to an internal validation ring before distributing the program instructions to an external validation ring.

9. The computer-implemented method of claim 7, wherein the throttle rule specifies the subset of the scope.

10. The computer-implemented method of claim 7, wherein the cool-down rule specifies a period of time between sequential distributions of the program instructions.

11. The computer-implemented method of claim 10, further comprising:
    receiving telemetry data regarding the distributing the programing instructions to the subset of the scope during the period of time.

12. A system, comprising:
    at least one processor; and
    at least one memory storing computer-executable instructions that when executed by the at least one processor cause the system to perform operations, comprising:
    receive a selection of program instructions for distribution, wherein the program instructions when executed implement an engineering job against a scope of a cloud computing environment;
    assign a default risk level of executing the engineering job against the scope, wherein the default risk level is associated with a default timing of distribution of the program instructions;
    determine one or more attributes associated with at least one of the program instructions or the scope;
    based on the determined attributes, determine a risk level of executing the program instructions against the scope, wherein the determined risk level is different than the default risk level;
    based on the determined risk level, determine one or more rules for governing a determined timing of distribution of the program instructions, wherein the determined timing of distribution is different from the default timing of distribution, wherein the one or more rules comprise at least a throttle rule and a cool-down rule;
    based on the throttle rule, distribute the program instructions to a first subset of the scope;
    based on the cool-down rule, wait for a period of time; and
    based on the throttle rule, distribute the program instructions to a second subset of the scope.

13. The system of claim 12, wherein the scope comprises an object type associated with the application services.

14. The system of claim 13, wherein the scope is defined based on common polices shared between objects.

15. The system of claim 12, wherein the determined risk level corresponds to a potential for adversely affecting a customer experience in response to executing the program instructions against the scope.

16. The system of claim 12, the computer-executable instructions when executed causing the system to perform further operations, comprising:
receive telemetry data regarding the distributing the programing instructions to the first subset of the scope during the period of time.

17. The system of claim 12, wherein the computer-executable instructions when executed by the at least one processor cause the system to perform further operations, comprising:
determine a priority of the engineering job;
based on the priority, place the program instructions in a position in a queue for distribution; and
based on the position in the queue, distribute the program instructions to the first subset of the scope.

18. A computer storage medium storing computer-executable instructions that when executed by a processor cause a computer system to perform operations, comprising:
receive a selection of program instructions for distribution, wherein the program instructions when executed implement an engineering job against a scope of a cloud computing environment;
assign a default risk level of executing the engineering job against the scope, wherein the default risk level is associated with a default timing of distribution of the program instructions;
determine one or more attributes associated with at least one of the program instructions or the scope;
based on the determined attributes, determine a risk level of executing the program instructions against the scope, wherein the determined risk level is different than the default risk level;
based on the determined risk level, determine one or more rules for governing a determined timing of distribution of the program instructions, wherein the determined timing of distribution is different from the default timing of distribution;
based on the one or more rules, distribute the program instructions to a subset of the scope;
during a period of time specified by the one or more rules, receive telemetry data regarding distribution of the program instructions to the subset of the scope; and
based on the telemetry data, update the program instructions.

19. The computer storage medium of claim 18, the computer-executable instructions when executed causing the computer system to perform further operations, comprising:
detect an anomaly based on the telemetry data; and
update the program instructions to address the anomaly.

20. The computer storage medium of claim 19, the computer-executable instructions when executed causing the computer system to perform further operations, comprising:
in response to detecting the anomaly, discontinue distribution of the program instructions.

* * * * *